US008939857B2

(12) United States Patent
Doering et al.

(10) Patent No.: US 8,939,857 B2
(45) Date of Patent: Jan. 27, 2015

(54) POWER TOOL WITH A TENSIONING DEVICE FOR A BELT

(75) Inventors: Manfred Doering, Zarrentin am Schaalsee OT Neuhof (DE); Cavit Dogan, Hamburg (DE)

(73) Assignee: Makita Corporation, Anjo (JP)

( * ) Notice: Subject to any disclaimer, the term of this patent is extended or adjusted under 35 U.S.C. 154(b) by 331 days.

(21) Appl. No.: 13/353,752

(22) Filed: Jan. 19, 2012

(65) Prior Publication Data

US 2012/0190488 A1 Jul. 26, 2012

(30) Foreign Application Priority Data

Jan. 20, 2011 (DE) .................... 20 2011 000 143 U
Aug. 15, 2011 (DE) .................... 20 2011 050 985 U

(51) Int. Cl.
| F16H 7/10 | (2006.01) |
| B23D 47/12 | (2006.01) |
| B24B 27/08 | (2006.01) |
| F16H 7/16 | (2006.01) |
| B24B 47/10 | (2006.01) |

(52) U.S. Cl.
CPC ............. *B23D 47/12* (2013.01); *B24B 27/08* (2013.01); *F16H 7/16* (2013.01); *B24B 47/10* (2013.01); *B23B 2200/086* (2013.01)
USPC ........................................................ 474/112

(58) Field of Classification Search
CPC ....... F16H 7/08; F16H 7/0827; F16H 7/1218; F16H 7/1263; F16H 7/1281; F16H 2007/0842; F16H 2007/0827
USPC .................................................. 474/112, 133
See application file for complete search history.

(56) References Cited

U.S. PATENT DOCUMENTS

| 724,417 | A | * | 4/1903 | Anderson | ...................... 474/112 |
| 1,733,968 | A |   | 10/1929 | Klieber | |
| 2,823,937 | A |   | 2/1958 | La Barre | |
| 3,829,176 | A | * | 8/1974 | Miokovic | ...................... 384/215 |
| 4,767,383 | A | * | 8/1988 | St. John | ...................... 474/133 |
| 4,816,012 | A | * | 3/1989 | Bytzek | ...................... 474/135 |
| RE34,543 | E | * | 2/1994 | Komorowski | ................ 474/135 |

(Continued)

FOREIGN PATENT DOCUMENTS

| DE | 38 41 644 A1 | 6/1990 |
| DE | 93 11 081.2 U1 | 11/1994 |

(Continued)

OTHER PUBLICATIONS

German Search Report issued in German Application No. 20 2011 000 143.1 dated Jul. 8, 2011 (with trans).
Extended European Search Report issued in European Patent Application No. 11196244.5 on May 4, 2012 (with translation).
German Search Report issued in German Patent Application No. 20 2011 050 985.0 on Apr. 24, 2012 (with translation).

*Primary Examiner* — William E Dondero
*Assistant Examiner* — Minh Truong
(74) *Attorney, Agent, or Firm* — Oliff PLC

(57) ABSTRACT

A power tool and a belt pulley of a belt drive for a power tool is provided with a tool driven by a motor by way of a belt drive, whereby the belt drive has a belt pulley rotating about a drive axle on the drive side and a belt pulley rotating about a tool axle on the tool side, and whereby a belt can be tensioned over the belt pulleys. At least one of the belt pulleys can be moved into an eccentric position in relation to its holding axle, with an assembly element being provided, with which the belt pulley can be returned into the concentric position in relation to the axle.

13 Claims, 10 Drawing Sheets

(56) References Cited

U.S. PATENT DOCUMENTS

| | | | |
|---|---|---|---|
| 5,730,561 A | 3/1998 | Wambeke | |
| 5,752,892 A | 5/1998 | Taomo et al. | |
| 6,149,542 A * | 11/2000 | Lehtovaara | 474/112 |
| 6,196,940 B1 * | 3/2001 | Lehtovaara | 474/112 |
| 7,101,295 B2 * | 9/2006 | Taomo et al. | 474/117 |
| 7,980,976 B2 * | 7/2011 | Stepniak et al. | 474/112 |
| 2002/0177499 A1 * | 11/2002 | Ayukawa et al. | 474/135 |
| 2004/0009837 A1 * | 1/2004 | Serkh et al. | 474/135 |
| 2008/0026894 A1 * | 1/2008 | Dinca et al. | 474/112 |
| 2011/0312454 A1 * | 12/2011 | Comsa et al. | 474/110 |

FOREIGN PATENT DOCUMENTS

| | | |
|---|---|---|
| DE | 94 12 559 U1 | 1/1996 |
| DE | 103 25 663 A1 | 12/2004 |
| DE | 10 2004 043 397 A1 | 3/2006 |
| DE | 10 2007 023 268 A1 | 12/2007 |
| DE | 10 2008 023 927 A1 | 11/2009 |
| DE | 20 2009 009 145 U1 | 1/2011 |
| FR | 2 640 178 A1 | 6/1990 |

* cited by examiner

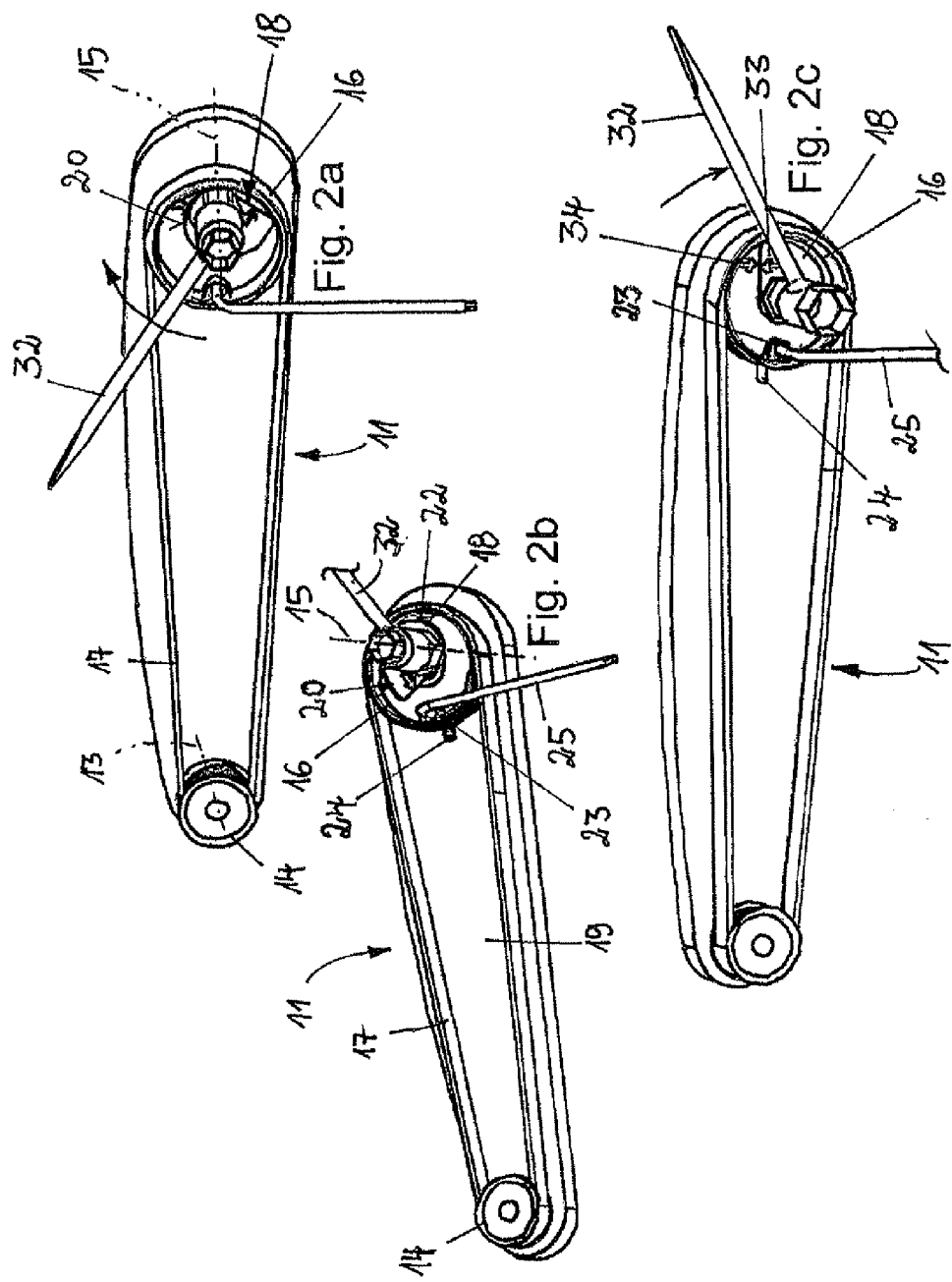

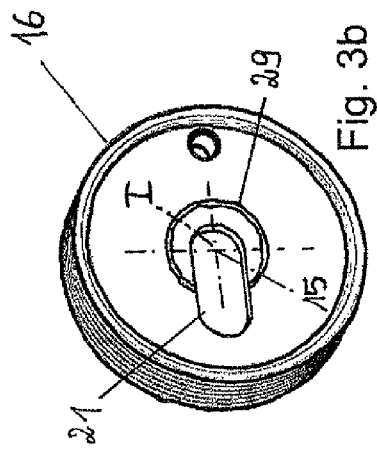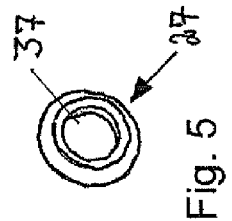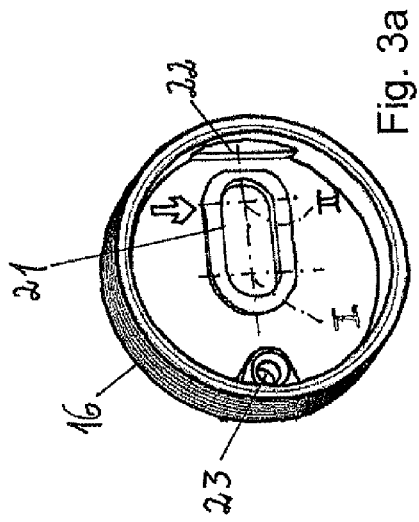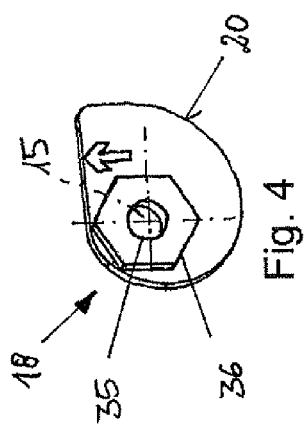

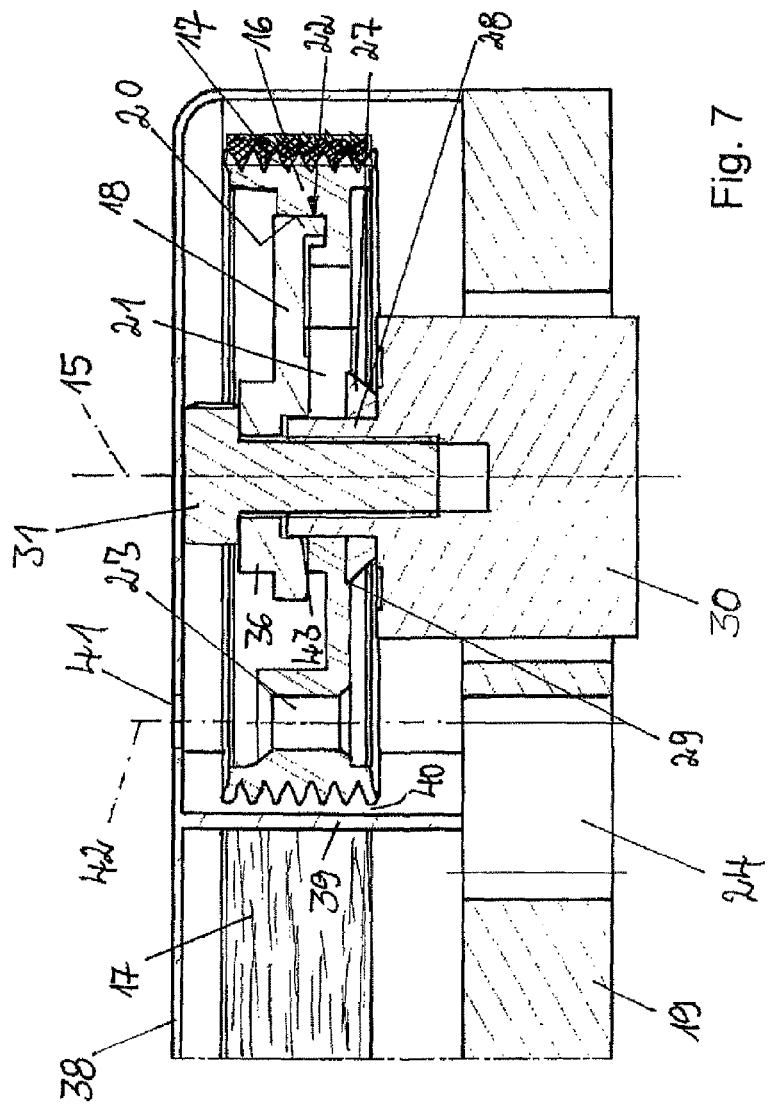

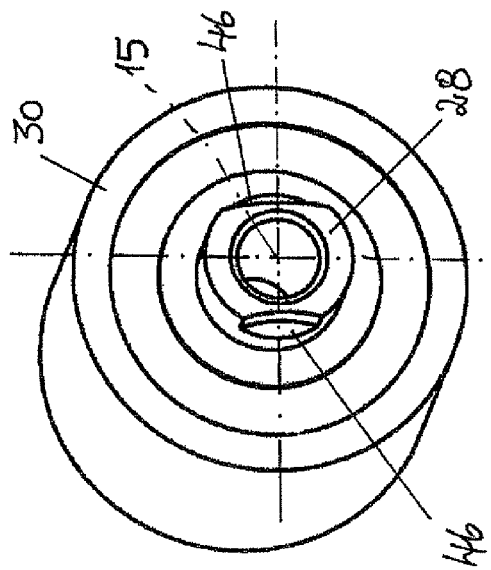
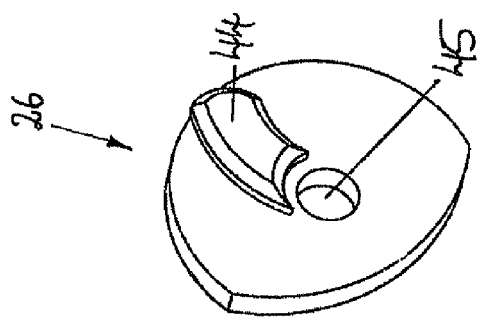
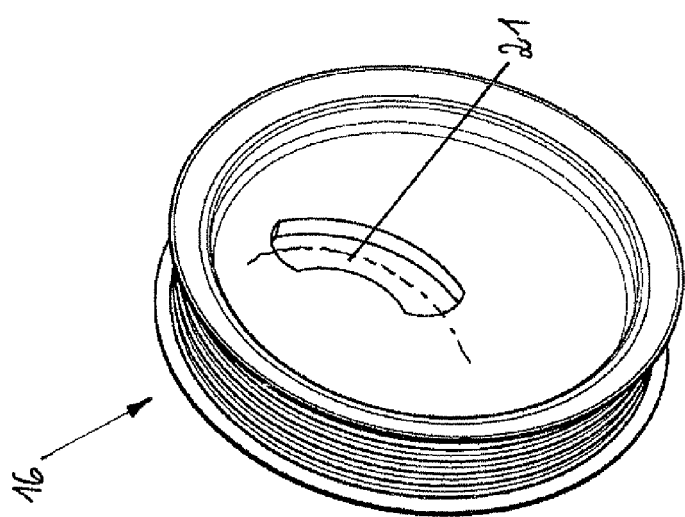

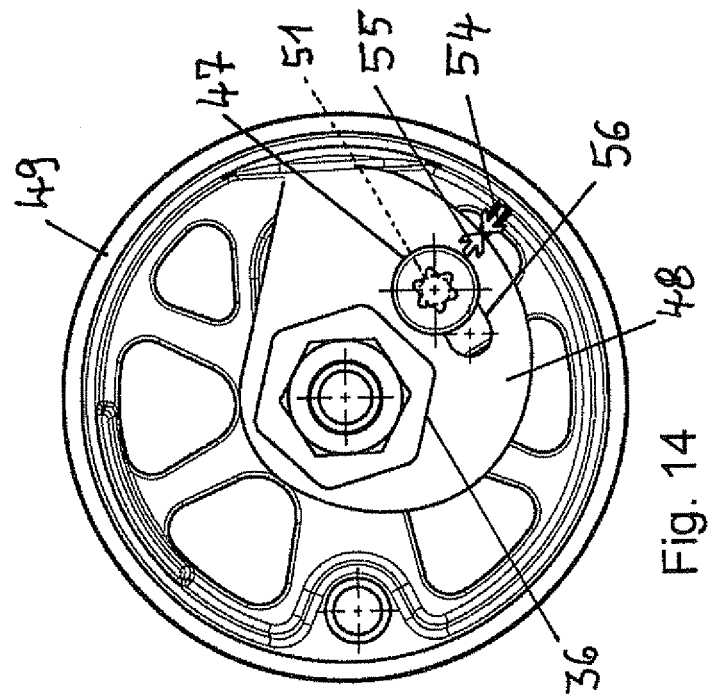
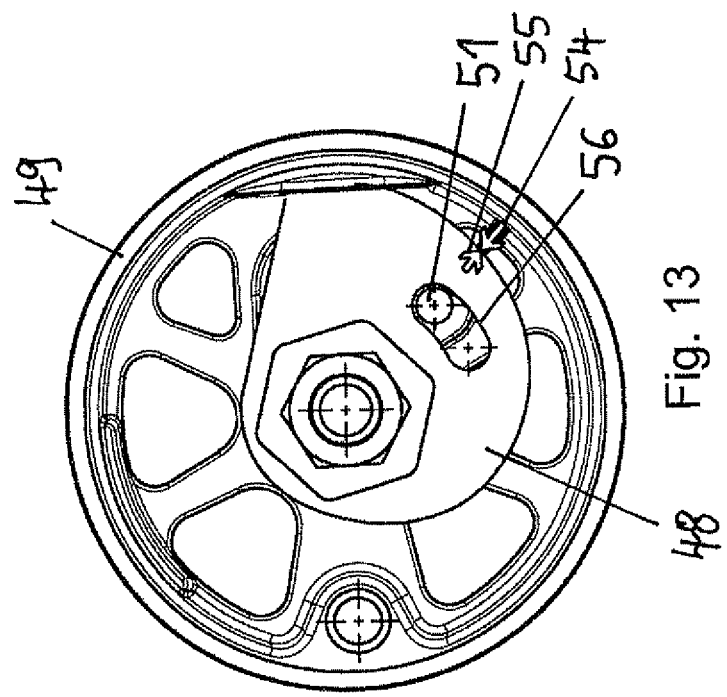

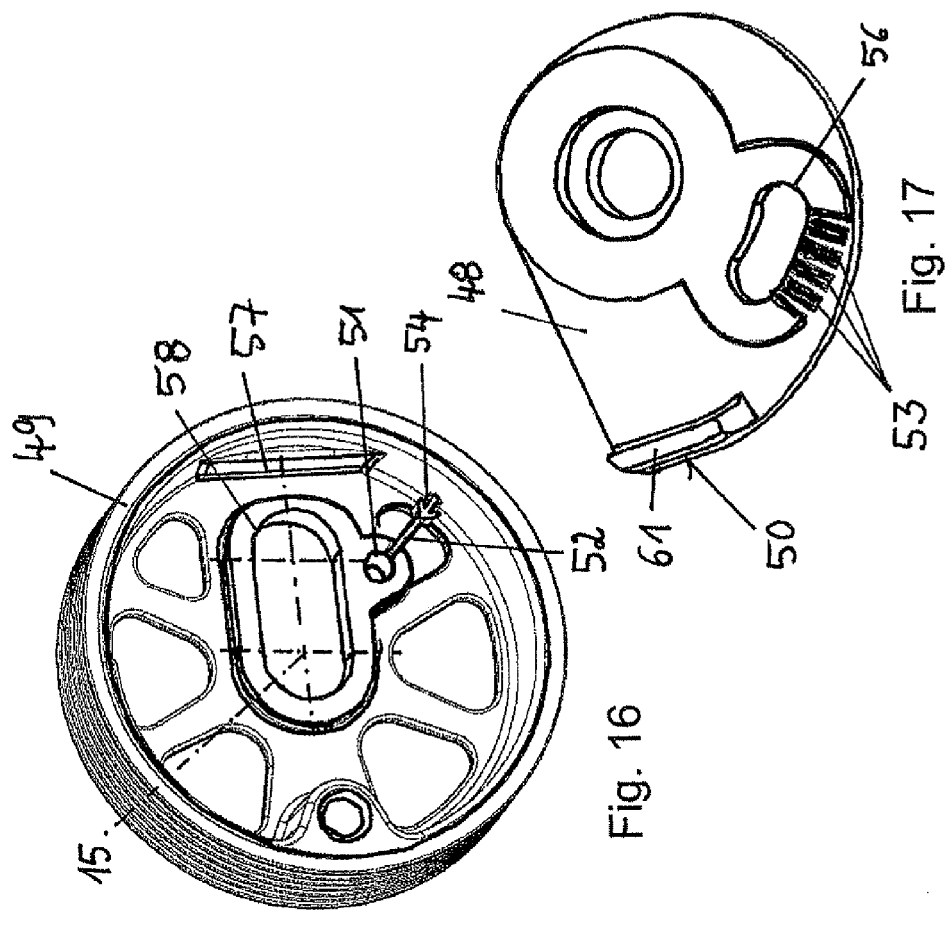
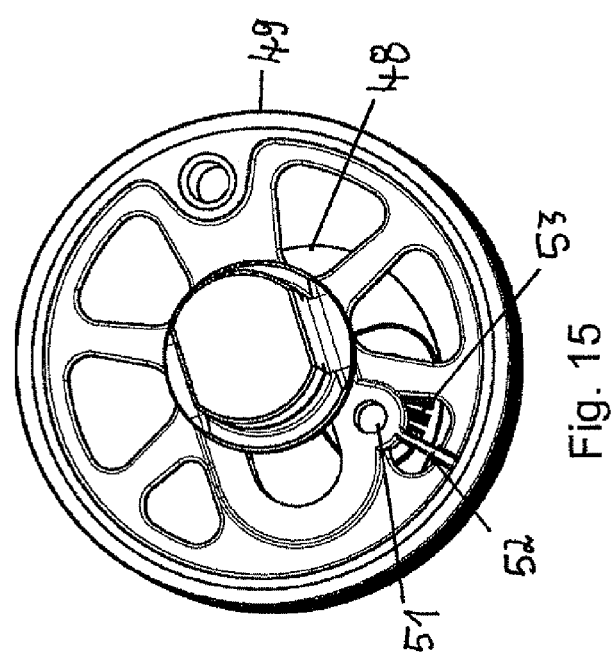

POWER TOOL WITH A TENSIONING DEVICE FOR A BELT

BACKGROUND

The present invention relates to a power tool with a motor and a tool driven by a belt drive, whereby on the drive side the belt drive has a belt pulley rotation in drive axle and on the tool side a belt pulley rotating in a tool axle, and whereby a belt is tensioned over the belt pulleys.

PRIOR ART

Power tools of the type of interest here, are preferably hand-held tools such as cutter grinders or circular saws. The power tools have a motor contained in a housing connected to the main body of the power tools. Separated from the motor, the power tool has a tools, for example, a grinding blade or a circular saw blade. Because of the spatial separation of the motor and tool, a belt drive is envisaged in order to transmit the drive power of the motor to the tool. The belt pulley on the drive side rotates about a drive axle and is driven by the motor, while the belt pulley on the tool side rotates about a tool axle which is in firm rotational connection with the tool. A belt is tensioned over the belt pulleys so that the belt pulley on the tool side is driven by the belt pulley on the drive side. The drive axle and the tool axle are run in parallel and at a distance from each other.

In order to be able to tension the belt over the belt pulleys it must be stretched firmly over the rigidly arranged belt pulleys. This results in the drawback of possible overstretching of the belt. The consequence of this can be damage to the belt. Essentially, a distinction can be made between non-elastic and elastic belts, more particularly ribbed belts. To tension elastic belts tensioning devices are known which keep the elastic belt permanently under tension.

DE 10 2008 023 927 A1, for example, shows a power tool with a motor and a tool driven by the motor via a belt drive, whereby the belt drive has a belt pulley on the drive side and one on the tool side and an elastic belt is tensioned between the belt pulleys. The tensioning device is provided and designed in such a way that the tension in the elastic belt is maintained by the elasticity of the belt itself. The tensioning device is based on an eccentric cam principle and is laborious to design and is susceptible to incorrect operation, which can lead to failure of the belt drive and breakdown of the power tool. More particularly, a number of individual working stages in the correct sequences are necessary in order to operate the tensioning device correctly so that a belt can be removed and re-tensioned again in the envisaged manner.

SUMMARY

It is therefore the objective of the invention to provide a tensioning device which is simply designed and easy to operate, and which prevents overstretching of the elastic belt. More particularly, the belt should not be permanently spring-loaded, such as through a self-tensioning tensioning device for example.

The invention includes the technical teaching that at least one of the belt pulleys can be brought into an eccentric position from its bearing axle and that an assembly element is provided with which the belt pulley can be returned into the position concentric with the axle.

The invention makes use of the concept of creating a tensioning device for a belt drive which is not based on temporarily changing the distance between the drive axle and the tool axle in order to be able to apply the belt over the belt pulleys. This dispenses with a laborious embodiment of the tensioning device, as in accordance with the invention, only one of the belt pulleys has to be moved from its concentric arrangement in relation to the axle on which the belt pulley is held during operation of the power tool into an eccentric position. To tension the belt only a simple assembly element is needed to move the belt pulley back into the concentric arrangement with the axle on which the belt pulley is held. If the belt pulley is again concentrically arranged in relation to the holding axle, both belt pulleys are again at a rigid distance from one another. More particularly, no spring element or suchlike is provided as a component of the tensioning device to permanently keep the belt under tension during operation of the power tool. More especially it is not necessary for the tensioning device to have to be kept in the tensioning position due to the tension of the elastic belt. This means that progressive elongation of the belt does not occur and because of its design the elastic belt can be ideally deployed in that the axle distance between the belt pulleys, via which the belt is driven, remains constant without these being subject to spring-loading in one belt tensioning direction.

The power tool can be designed with an extension arm to which the tool in the tool axle is attached in a rotating manner. The extension arm forms a rigid arrangement of the drive axle to the tool axle. The extension arm can be provided with two bearing paths and the extension arm can be part of the main body of the power tool. More particularly, the extension arm is not moveable, and more particularly is not arranged on the main body of the power tool in a pivoting or articulated manner in order to form a tensioning device. This results in a further simplification of the design of the main body of the power tool. More advantageously the belt pulley which can be moved into a position which is eccentric in relation to its axle, can be the tool-side belt pulley. Alternatively it is also possible for the belt pulley which can be moved into an eccentric arrangement in relation to its axle, to be formed by the drive side belt pulley so that tensioning of the belt can take place by way of an eccentric arrangement of the drive-side pulley on the device axle.

The assembly element can be designed so that this is rotatable around the tool axle and has an eccentric cam by means of which the belt pulley through turning the assembly element about the tool axis, particularly when applying pre-tensioning to the belt, can be returned to the concentric arrangement with the tool axle. The belt pulley can be fastened to the tool axle with a central screw on the tool axle. If the centre screw is loosened, the belt pulley adopts a movable arrangement on the tool axle. Through loosening of the central screw the assembly element can also be turned on the tool axle. By way of the eccentric cam present on the assembly element the belt pulley can be moved back and forth between the eccentric arrangement and the concentric arrangement with the tool axle. If a belt is to be tensioned onto the belt drive, the central screw is loosened and the belt pulley is moved on the tool axle into a position eccentric to the tool axle through turning the assembly element. The belt can then be attached and through turning the assembly element the belt pulley is returned back into the position concentric with the axle.

To allow movement of the belt pulley between the eccentric and the concentric position on the holding axle, the belt pulley has an elongated hole through which the tool axle passes. In this way the belt pulley can be moved between the eccentric position and the concentric position through moving the tool axle in a belt tensioning device. The belt tensioning device extends in the direction of the drive axle. In this way the distance between the two belt pulleys is changed, and the distance between the two belt pulleys is shortened if the belt pulley on the drive axle is moved into the eccentric position, and the distance is increased again if the tool axle is returned into the concentric arrangement with the axis of rotation of the belt pulley through turning the assembly element.

The distance between the two belt pulleys if the belt pulley is again arranged concentrically with the tool axle, corresponds with the operational distance of the belt drive when the power tool is being used.

Of further advantage a pressure surface can be included in the belt pulley against which the eccentric cam can be brought into contact. The assembly element can be designed as a plate-shaped contoured disk with an axial hole, and the belt pulley can have a recess into which the plate-shaped assembly element can be inserted. In this way the assembly element together with the belt pulley can be held on an axial body of the tool axle and secured with the central screw. If the assembly element contoured with the eccentric cam is in the belt pulley, the contour of the eccentric cam can press against the pressure surface of the belt pulley, and the pressure surface is inside the belt pulley. If the assembly element is turned relative to the belt pulley on the axial body of the tool axle, the distance of the point of contact of the contour of the eccentric cam with the surface changes with regard to the tool axle. The belt pulley can thus been moved between the concentric and eccentric position for corresponding axial offsetting.

So that the belt pulley does not turn too when the assembly element is turned, means are provided through which the belt pulley can be blocked from rotating about the tool axle, so that it is possible to turn the assembly element about the tool axle relative to the belt pulley. The means can be in the form of a hole in the belt pulley and an elongated hold in the extension arm, whereby a bolt can be passed through the hole and the elongated hole. An inverse design is also possible, in which the longitudinal hole is in the belt pulley and the hole in the extension arm. If the bolt is passed through the hold in the belt pulley, the bolt forms a type of guide element in the elongated hold of the extension arm. The elongated hole in the extension arm extends in the direction between the drive axle and the tool axle in order to all displacement of the belt pulley to reduce the distance between the two belt pulleys.

If the assembly element is turned and the contour of the eccentric cam moved along the pressure surface of the belt pulley, the belt pulley is moved in the belt tensioning device until with displacement of the bolt in the elongated hole, the belt pulley is finally arranged concentrically with the tool axle. The central screw can then be tightened in the axle body and the tool-side belt pulley and the assembly element are firmly connected to each other through the central screw. The bolt can then be removed from the hole and the elongated hole and the belt pulley rotates together with the assembly element about the tool axle and the power tool can be operated. The elongated hole in the extension arm, though which the bolt can be passed when jointly arranged with the hole in the belt pulley, can be straight or in the form of a arc-shaped groove with a curvature. The advantage of an arc-shaped elongated hole is that the tensile force always acts in the direction of the force application point between the eccentric cam of the assembly element and the pressure surface of the belt pulley. This further facilitates moving the belt pulley from the eccentric position to the concentric position in relation to the tool axle.

It can also be envisaged that after returning belt pulley into the concentric position a securing element can be inserted into the elongated hole to secure the belt pulley in the concentric arrangement with the tool axle. The securing element can have an attachment in the form of a slot nut. When arranging the securing element plan-parallel on the plate-shaped assembly element this slot nut is secured in the elongated hole in the belt pulley in the position in which the belt pulley is arranged concentrically with the tool axle.

In addition or alternatively to the securing element a securing ring can be provided which when the belt pulley is arranged concentrically with the tool axle is placed on the axial body of the tool axle and inserted into a recess in the belt pulley. The securing ring, like the securing element, can only be placed on the belt pulley and the axle body when the belt pulley is arranged concentrically with the tool axle. Like the securing element the securing ring can have an axial hole, through which the axle body of the tool axle passes. The securing ring can then only be arranged in the recess in the belt pulley if the latter is concentric with the tool axle, whereby the securing ring ensures that the power tool with the belt drive can only be operated when the securing element or securing ring is arranged on the axial body and can be inserted into the elongated hole or into the recess.

A further form of embodiment to secure the tensioning arrangement of the belt pulley can be provided with securing screw with which the assembly element can be screwed to the belt pulley, whereby a splint or a bolt can also be used for securing. For passing through the securing screw, the assembly element can have an elongated hole which is dimensioned so that the securing screw can be passed through the elongated hole if the eccentric cam is not worn and/or if the assembly element is adequately tensioned, whereby the belt pulley preferable has at threaded hole into which the securing screw can be screwed. For this the elongated hole and the threaded hole must overlap at at least one position in the elongated hole in order to screw the securing screw into the threaded hole. The elongated hole create a tolerance area so that securing screw can also be screwed into threaded hole to screw the assembly element in the belt pulley when initial, but still permissible wearing of the eccentric cam of the assembly element has begun. If the eccentric cam has not been turned to the end tensioning position in the belt pulley, but the turning position is however sufficient for the required tensioning, the securing screw can also be passed through the elongated hole and screwed into the threaded hole in the belt pulley.

The provision of the securing screw offers the advantage that after the tensioning process and tightening of the central screw, the belt pulley and the assembly element can be form-fitted to each other. The form-fit geometry is already present through the provision of the securing screw for screwing the assembly element in the belt pulley.

However, in order to also create the form-fit geometry in the direction of turning of the assembly element within the belt pulley, the assembly element and the belt pulley each have form-fit geometries which can be interlocked and through which turning of the assembly element in the belt pulley is prevented, more particularly when the assembly element is screwed to the belt pulley with the securing screw. For example, the form-fit geometry can only interlock between the assembly element and the belt pulley when the securing screw is screwed in and the form fit is secured with the securing screw.

For example, the form-fit geometry can have a rib provided on the belt pulley and preferably several grooves provided on the assembly element whereby the rib engages in one of the grooves if the eccentric cam is not worn and/or if the assembly element is sufficiently tensioned. For example, the rib can coincide with the grooves if the elongated holed overlaps the threaded hole in such a way that the securing screw can be passed through the elongated hole and screwed into the threaded hole.

The assembly element can have a hexagonal attachment and therefore be turned with a hand tool about the tool axle. Particularly advantageously the securing screw can be arranged in relation to the hexagonal attachment in such a way that the tool cannot come into effective contact with the hexagonal attachment when the assembly element is screwed to the belt pulley with the securing screw.

More particularly, the distance between the hexagonal attachment and the securing screw can be so small that the tool cannot be attached to the hexagonal attachment. More particularly assembly should be possible with the tool supplied with the power tool, which means that a stop for a slit screwdriver of a combination wrench has to be provide in the crank housing and a guide in the assembly element, so that with securing screw has to be tightened with a torx, without turning the assembly element in the belt pulley. Consequently the bolt must first be removed from the hole in the belt pulley and the elongated hold in the extension arm, in order to then be able to operate the securing screw, as both the torx attachment and the area of tool for securing the belt pulley against turning in the extension arm forming the bolt is designed as a one-piece tool.

In order to further improve checking the required tensioning position of the assembly element in the belt pulley, a marking arrow can be applied to the belt pulley and also on the assembly element, whereby the marking arrows are both visible to a user when turning the assembly element in the belt pulley. The marking arrows can be moved towards each other by turning the assembly element about the tool axle in the belt pulley through the assembly element rotating in the belt pulley. Then, when optimum tensioning of the assembly element in the belt pulley is achieved the marking arrows can point towards each other.

The objective of the present invention is also achieved through a belt pulley of a belt drive for a power tool, whereby the belt drive has a belt pulley rotating about a drive axle on the drive side and a belt pulley rotating about a tool axle on the tool side, whereby it is envisaged that the belt pulley has an elongated hole through which an axle can be passed on which the belt pulley can be held and adjusted along the elongated hole on the axle between an eccentric and a concentric position. The aforementioned advantages for the power tool apply equally to the belt pulley in accordance with the invention.

The objective of the present invention is also achieved through a method of assembling a belt of a belt drive between a motor and a tool of a power tool, whereby the belt drive has a belt pulley rotating about a drive axle on the drive side and a belt pulley rotating about a tool axle on the tool side, whereby the method includes at least the following steps: moving at least one of the belt pulleys from a concentric arrangement with the axle on which the belt pulley is held, into an eccentric arrangement; application of the belt on the belt pulleys and returning the belt pulley into the concentric arrangement with the axle, whereby the belt is pre-tensioned.

It can also be envisaged that an assembly element is held in a rotating manner on the axle, whereby the assembly element is turned about the axle so that the belt pulley is moved by the eccentric cam into the concentric arrangement with the axle, with the belt being tensioned accordingly at the same time.

For the method in accordance with the invention it can also be envisaged that the belt pulley has an elongated hole through which the axle extends so that the belt pulley is moved between the eccentric arrangement and the concentric arrangement during displacement of the axle in the elongated hole in one belt tensioning direction when the assembly element is turned about the axle. As a further advantage means can also be used through which the belt pulley is blocked around the axle so that the assembly element is turned about the axle relative to the belt pulley.

In accordance with an advantageous further embodiment of the method a securing screw can be provided with which the assembly element is screwed to the belt pulley, whereby the securing screw is screwed in when the assembly element is brought into the envisaged tensioning position and the belt pulley is arranged concentrically with the axle.

This results in a procedure for tensioning the belt which is started with a loosened central screw. At this stage of the tensioning procedure the securing screw is still screwed in between the assembly element and the belt pulley. A start can thus be made with turning the assembly element in the belt pulley while the eccentric cam slides against the pressure surface in the belt pulley. Turning of the assembly element in the belt pulley takes place with a total turning angle which is achieved when the eccentric cam is in its end position against the pressure surface in the belt pulley.

An elongated hole is provided in the assembly element and there is a threaded hole in the belt pulley. In the nominal position for tensioning the belt, the elongated hole overlaps the threaded hole and the securing screw can be passed through the elongated hole and screwed into the threaded hole. In doing so, both on the assembly element and on the belt pulley a marking arrow can be provided which point to each other in the desired tensioning position. This assures the operator that the required tensioning position of the assembly element in the belt pulley has been reached. The central screw for screwing the belt pulley into the axial body of the tool-side bearing arrangement can then be tightened. Only after completion of the tensioning process and tightening of the central screw can the securing screw be arranged and tightened between the assembly element and the belt pulley. The user can remove the hand tool with which the assembly element is turned in the belt pulley and which fits on the hexagonal attachment of the assembly element, and the bolt, at the end of which is a torx socket, for example, can be used to screw in the securing screw. The tensioning process is ended by a cover element being arranged on the extension arm which fully covers the belt drive.

The features and advantages set out above for the power tool in accordance with the invention apply equally to the method in accordance with the invention of fitting the belt of the belt drive.

BRIEF DESCRIPTION OF THE DRAWINGS

Further measures of improving the invention are set out below in more detail with the aid of the drawings, together with a description of a preferred example of embodiment of the invention. Purely schematically:

FIG. 2a shows the belt drive with a drive-side belt pulley which is concentrically arranged with a drive axle, and with a tool-side belt pulley which is eccentrically arranged with regard to the tool axle in order to apply the belt onto the belt pulleys, FIG. 2b shows the arrangement of the belt drive in accordance with FIG. 2a whereby the tool-side belt pulley has already been moved in the direction of the concentric arrangement with the tool axle, FIG. 2c shows the arrangement of the belt drive in accordance with FIGS. 2a and 2b, wherein the drive-side belt pulley is arranged concentrically on the drive axle and the tool-side belt pulley is arranged concentrically on the tool axle so that the belt drive can be operated, FIG. 3a shows a perspective view of a belt pulley with an elongated hole so that the belt pulley can be moved between an eccentric and a concentric arrangement relative to the holding axle, FIG. 3b shows a further perspective view of the belt pulley in accordance with FIG. 3a, FIG. 4 shows a perspective view of an assembly element in accordance with the present invention.

FIG. 5 shows a perspective view of a securing ring,

FIG. 7 shows a cross-section of the arrangement of the tool-side belt pulley on the tool axle with an extension arm and a covering element, FIG. 8 shows a further example of embodiment of a belt pulley with an elongated hole designed as an arc-shaped groove with curvature, FIG. 9 shows a perspective view of a securing element, FIG. 10 shows a perspective view of a bearing arrangement for rotationally holding an axle body which forms the holding axle for holding the tool and can be rotated in the tool axle, FIG. 13 shows the example of embodiment of the tensioning wheel device in accordance with FIGS. 11 and 12 with an assembly element turned to an assembly end position, FIG. 14 shows the example of embodiment of the tensioning wheel device in accordance with FIGS. 11 to 13 with a securing screw to secure the turning position of the assembly element on the belt pulley, FIG. 15 shows a rear view of the belt pulley with the assembly element, FIG. 16 shows a perspective view of the belt pulley for arranging an assembly element in accordance with FIG. 11, FIG. 17 shows a perspective view of the assembly element from the side which when arranged on the belt pulley faces the latter and FIG. 18 shows a further perspective view of the belt pulley with an assembly element arranged thereon and with a colour field for marking the tensioning position.

DETAILED DESCRIPTION OF THE EMBODIMENTS

Figure 1:
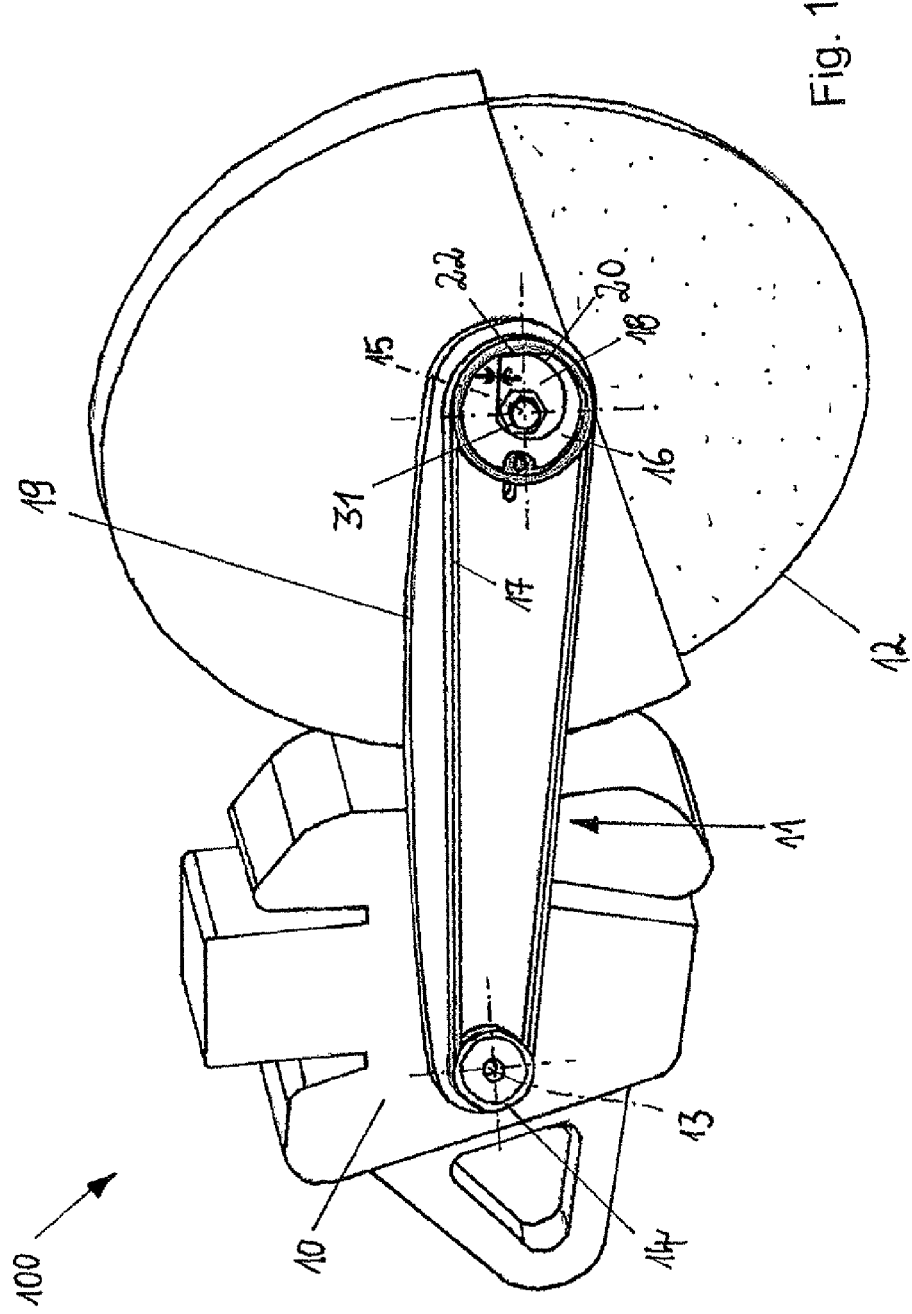
FIG. 1 shows perspective view of an example of embodiment of a power tool with a belt drive in accordance with the invention between a motor and a tool.

FIG. 1 shows a perspective view of an example of embodiment of a power tool 100. The power tool can be a hand-held, portable power saw, or, as shown, a hand-held, portable grinding cutter. The power tool 100 has a motor 10, for example a reciprocating piston or a rotary piston motor. The motor 10 drives a motor shaft which rotates a drive axle 13 and arranged on the motor shaft is a drive-side belt pulley 14. Arranged on the motor 10 or on the basic structure of the power tool 100 is an extension arm 19, which is rigid and can form part of the basic body of the power tool 100, in a manner which is not shown in more detail. At the projecting end of the extension arm 19 a tool 12 is rotatably held in a tool axle 15. Also arranged on the tool axle 15 is a tool-side belt pulley 16 which is connected to the tool 12 in such a way that rotary driving of the tool-side belt pulley 16 rotates the tool 12 about the tool axle 15. A belt 17 loops round both the drive-side belt pulley 14 and the tool-side belt pulley 16 so that the drive belt pulley 14 can rotate the tool side belt pulley 16. The belt 17 is designed as an elastic belt 17 also known as an elastic belt.

To form a tensioning device the tool-side belt pulley 16 can be moved in a position eccentric with regard to its axle 15, whereby purely as an example, the tensioning device is illustrated by way of the axial offsetting of the tool-side belt pulley 16, which can also take place with the drive-side pulley 14.

Through the eccentric arrangement of the belt pulley 16 with regard to its holding axle 15 the distance between the two belt pulleys 14 and 16 can be temporarily reduced in order to fit the belt 17.

For this, loosening of a central screw 31 can be envisaged so that the belt pulley 16 can be moved eccentrically from, the concentric arrangement with the tool axle 15 in order to fit the belt 17. If the belt 17 is attached over both belt pulleys 14 and 16, in accordance with the invention an assembly element 18 can be provided, with which during pre-tensioning of the belt 17 the belt pulley 16 can be returned to the concentric arrangement with the tool axle 15. For this the assembly element 18 has an eccentric cam 20, and the eccentric cam 20 can press with its eccentric contour against a pressure surface 22 which is arranged on inside of the tool-side belt pulley 16. If the assembly element 18 is now turned about the axle 15, the distance between the point of contact of the eccentric cam 20 and the pressure surface 22 and the tool axle can be increased again as a function of the angle of rotation of the assembly element 18 about the tool axle 15 until the axis of rotation of the belt pulley 16 is concentric in relation to the tool axle 15. The central screw 31 can then be tightened again and the assembly element 18 with the tool-side belt pulley 16 forms a rotating unit for operating the belt drive 11. Thus, without changing the distance between the drive axle 13 and the tool axle 15, the belt 17 can be easily tensioned on the belt pulleys 14 and 16. More particularly, the extension arm 19 can be rigid, which results in a considerably structural simplification of the tensioning device which is necessary in order to fit the belt 17 onto both belt pulleys 14 and 16 without overstretching it. More especially the tensioning device does not require any additional tensioning roller, which would be pre-tensioned against the belt by means of a spring-loading device.

FIGS. 2a, 2b and 2c each show a perspective view of the belt drive 11. In FIG. 2a the tool-side belt pulley 16 is arranged eccentrically in relation to the tool axle 15. In this arrangement the belt 17 can be looped over the belt pulleys 14 and 16 without stretching it. Once the belt 17 is arranged over both belt pulleys 14 and 16, the assembly element 18 can be turned about the tool axle 15 with a hand tool 32. The eccentric cam 20 then moves along the inner side of the belt pulley 16 and pushes it in the direction of concentric arrangement in relation to the tool axle 15. While the belt pulley 16 is being moved from the eccentric to the concentric position the distance between the drive axle 13 and the tool 15 remains unchanged. The direction of rotation of the tool is shown with an arrow around the tool axle 15.

FIG. 2b shows the belt drive 11 with the belt pulley 16 which has already been moved in the direction of the tool axle 15 so that the distance between the drive-side belt pulley 14 and the tool side belt pulley 16 is increased further, and whereby through the increase in the distance the belt 17 has been tensioned. Compared to the position in 2a, the hand tool 32 is turned further about the tool axle 15, and the eccentric cam 20 of the assembly element 18, which is pressing against inner pressure surface 22 in the belt pulley 16, has a circumferential position in relation to the point of contact with the pressure surface 22, which is already greater than the distance to the tool axle 15. So that the belt pulley 16 does not turn when turning the assembly element 18 with the hand tool 32 a bolt 25 is provided which is passed through a hole 23 and an elongated hole 24. The hole 23 is provide in the belt pulley 16 and the elongated hole 24, extending in the direction between the two pulleys 14 and 16, is provided in the extension arm 19. By arranging the bolt 25 both through the hole 23 and through the elongated hole 24, the belt pulley 14 can move with a changing distance to the belt pulley 14 in that the bolt 25 travels along through the elongated hole 24.

However, the rotating position of the belt pulley 16 remains unchanged. As a result the eccentric cam 20 can slide against the pressure surface 22 without the belt pulley 16 also turning through the friction between the eccentric cam 20 and pressure surface 22 of the belt pulley 16. Purely as an example the bolt 25 is shown as a socket wrench, and the bolt 25 can also be used for arrangement through the hole 23 and the elongated hole 24 if for example, the tool 12 has to be changed while the belt pulley 16 has to be blocked from turning about the tool axle 15.

In FIG. 2c the belt drive 11 with the tensioning device is shown, whereby the tool-side belt pulley 16 has already assumed the concentric position with regard to the tool axle 15. Compared with the view in FIG. 2b it can be seen that the bolt 25 inserted in the hole 23 has moved along the elongated hole 24. It can also be seen that the hand tool 32 is in angle position turned further than in FIGS. 2b and 2a.

On the assembly element 18 a first marking arrow 33 is applied, in manner visible to the user, which is shown point to point with a second marking arrow 34 which is applied on the inner side of the belt pulley 16. When the two marking arrows 33 and 34 point towards each other, as in the drawing the definitive tensioning position of the belt pulley 16 by the assembly element 18 can be shown. Only in this position can the belt pulley 16 be arranged concentrically with regard to the tool axle 15, so that the required turning of the assembly element 18 about the tool axle 15 by way of the hand tool 32 has reached its end position. In addition, the marking arrows 33 and 34 indicate wearing of the assembly element 18 and the belt pulley 16 respectively, and if the two marking arrows 33 and 34 are offset with regard to each other, wearing of the assembly element 18, more particularly the surface of the eccentric cam 20 and the pressure surface 22 can be deduced. Such wear could, in particular, have the consequence that the belt pulley 16 no longer runs concentrically around the tool axle 15 as a result of which the drive belt could be damaged during operation of the power tool 100.

FIGS. 3a and 3b show a front and a rear view of an example of embodiment of the belt pulley 16. As an essential design feature for bringing about axial offsetting of the belt pulley 16 on the tool axle 15, the belt pulley 16 has an elongated hole 21. The tool axle 15 extends through the elongated hole 21 if the belt pulley 16 is arranged on the tool axle 15. The tool axle 15 assumes position I in the elongated hole 21 if the tool axle is concentric with the axis of rotation of the belt pulley 16 and, through displacement of the belt pulley 16 the tool axle assumes position II which reflects the eccentric arrangement of the tool axle 15 in relation to the axis of rotation of the belt pulley 16.

Also shown in the hole 23 positioned opposite the pressure surface 22, which is arranged inside the belt pulley 16 as a flank and against which the eccentric cam 20 of the assembly element 18 can press, which is shown in FIG. 4.

FIG. 4 shows the assembly element 18 with the eccentric cam 20, and in the assembly element 18 an axial hole 35 is provided, and the tool axle 15 extends through the axial hole 35 when the assembly unit 18 is arranged on the tool axle 15.

The assembly element 18 is plate-shaped and around the axial hole 35 a hexagonal attachment 36 is applied on a planar surface of the assembly element 18. By way of the hexagonal attachment 36 the hand tool 32 shown in FIGS. 2a, 2b and 2c can be attached on the assembly element 18 in order turn the assembly element 18 about the tool axle 15 so that the eccentric cam 20 slides along the pressure surface 22.

In addition, the central screw 31, see FIG. 1, can pass through the axial hole 35. A more detailed arrangement of the assembly element 18 on the axle body 28 in the tool axle 15 by way of the central screw 31 is shown in FIG. 7.

FIG. 3b shows the tool-side belt pulley 16 from the opposite side from that in FIG. 3a. In the concentric arrangement I of the tool axle 15 the elongated hole 21 is framed by a recess 29. A securing ring 27 as shown in FIG. 5 can be inserted into the recess 29. In the securing ring 27 there is a further axial hole 37 through which the tool axle 15 can extend. If the belt pulley 16 is brought into the concentric arrangement with the tool axle 15, so that the tool axle 15 is in position I, the securing ring 27 can be pushed over the tool axle 15 to lock it into the recess 29. If the central screw 31 is then tightened, the securing ring 27 is firmly secured in the recess 29 and the belt pulley 16 is secured in the concentric position I on the tool axle 15, without the need for securing via the pressure contact of the eccentric cam 21 of the assembly element 16 against the pressure surface 22 on the inner side of the belt pulley 16, even during operation of the power tool 100.

Figure 6:
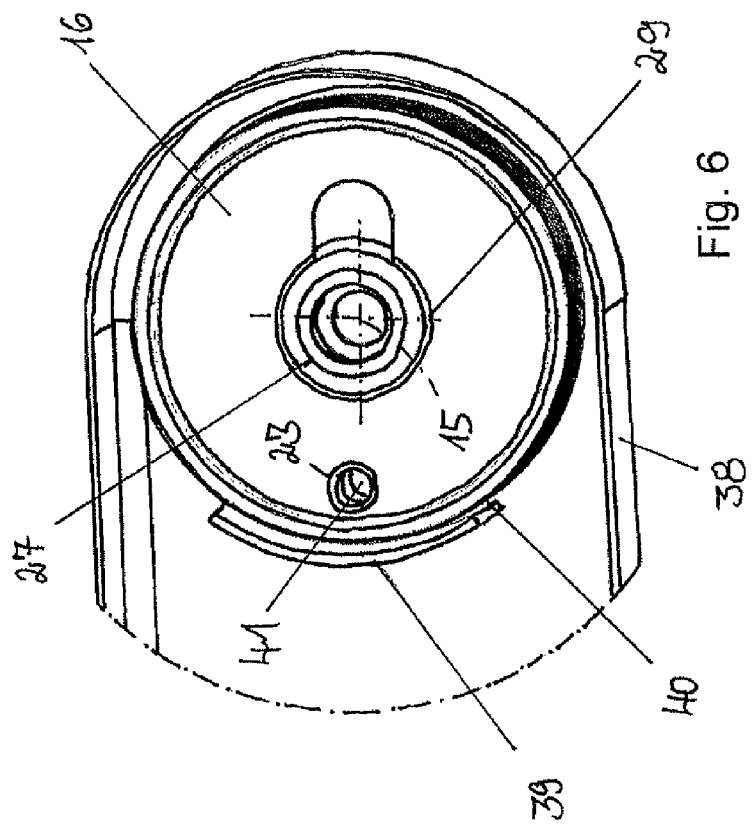
FIG. 6 shows a perspective view of a belt pulley arranged concentrically with regard to the axle in which the belt pulley is held.

FIG. 6 shows an arrangement of the tool-side belt pulley 16 and a cover element 38, which after completing the assembly of the belt 17 can be mounted on the extension arm 19, which is not shown in more detail. The belt pulley 16 is arranged concentrically with the tool axle 15 so that the securing ring 27 can be inserted into the recess 29 in the belt pulley 16. The securing ring 27 can also be mounted in front of the belt pulley 16 on the axle body in the tool axle 15 so that on reaching the concentric position of the belt pulley 16 with the tool axle 15 if engages in the recess 29.

In the cover element 38 there is a rib, which is positioned in the cover element 28 forming a space 40 to the belt pulley 16.

The rib 39 is arranged in the covering element 38 so that the belt pulley 16 would come into contact with the rib 39 if the belt pulley 16 were to be moved from the shown concentric arrangement with regard to the tool axle 15 into the eccentric arrangement. If the belt pulley 16 accidentally moves towards the rib 39, overcoming the space 40, the belt pulley 16 can come into contact with the rib 39 during operation of the power tool 100. In operation the belt pulley 16 rotates and creates a grinding sound if the belt pulley 16 were to come into contact with the rib 39. In this way an indicator can be created showing whether the belt pulley 16 is indeed mounted correctly and is arranged concentrically with the tool axle 15. More particularly, the cover element 38 can only be mounted on the extension arm 19 if the belt pulley 16 is in the required concentric arrangement with the tool axle 15.

In the cover element 38 there is also an opening 41, which in the shown rotational position of the belt pulley 16 can be made to coincide with the hole 32 in the belt pulley 16, so that the opening 41, and the hole 23 are flush with the elongated hole 24 in the extension arm 19. If the tool 12 of the power tool 100 is to be changed, the bolt 25 shown in FIGS. 2a, 2b and 2c can be passed through the opening 41, the hole 23 and the elongated hole 24 in order to block the rotational movement of the belt pulley 16 and consequently the tool 12, without the cover element 38 having to be taken off the extension arm 19.

FIG. 7 shows a cross-section view of the arrangement of the tool-side belt pulley 16 on the extension arm 19. The belt pulley 16 is shown arranged concentrically in relation to the tool axle 15 so that the power tool 100 can be operated in arrangement shown. Also shown is the belt 17 which passes round the tool-side belt pulley 16. To hold the belt pulley 16 around the tool axle 1, the latter is mounted on an axle body, and the axle body extends through the elongated hole 21 in the belt pulley 16.

For positioning the belt pulley 16 a securing ring 27 is provided between the belt pulley 16 and the axle body 28 through which the axial body extends, whereby the securing ring 27 is in the recess 29 of the belt pulley 16. Shown adjoining the belt pulley is the assembly element 18, which is turned with regard to the belt pulley 16, so that it is in the turning position shown in FIG. 2c. In the position of the largest radius of the eccentric cam 20, the eccentric cam 20 of the assembly element 18 presses against the pressure surface 22 on the inner side of the belt pulley 16. The assembly element 18 is mounted on the axle body 28 by means of a central screw, and the axle body 28 is arranged in a rotating manner about the tool axle 15 on the extension arm 19 by way of a bearing arrangement 30.

The cross-section view also shows the elongated hole 24 in the extension arm 19, and the hole 23 in the belt pulley 16 as well as the opening 41 in the cover element 41 flush with regard to each other in a stop axle 42. In the shown arrangement of the belt pulley 16 with the assembly element 18 the cover element 38 with the rib 39 can be mounted on the extension arm 19, with a space 40 present between the rib 39 and the belt pulley 16.

The assembly element 18 is held on the axle body 28 by way of a centring element 43, and in order to turn the assembly element 18 about the tool axle 15 into the shown end position, the central screw 31 must first be loosened slightly, without the assembly element 18 being removed from the axle body 28 and the centring element 43 being loosened. If on introducing the bolt through the hole 23 and through the elongated hole 24 the assembly element 18 is turned to the end position about the tool axle 15, the central screw 31 has to be tightened again. The bolt can then be removed from the hole 23 and the elongated hole 24 in order to then mount the cover element 38. However, the central screw 31 has to be loosened so far that the securing ring 27 can move on the underside of the belt pulley 16 until in the concentric position it arrives at the recess 29 in the belt pulley 16 in order to finally enter the recess 29 in the belt pulley 16 on tightening the central screw 31.

In FIG. 8 a further example of embodiment of a belt pulley 16 with an elongated hole 21 is shown, which is designed as an arc-shaped grove with a curvature. Through the arc shape of the elongated hole 21 the tensile force between the eccentric cam 20 of the assembly element 18 and the pressure surface 22 of the belt pulley always acts tangentially to the position of the body 28 in the elongated hole 21, as has already been described for the arc-shaped elongated hole 24 in the extension arm 19, so that the force to be applied with hand tool 32 can be considerably reduced. As a result, during the tensioning process, i.e. when turning the assembly element 18 relative to the belt pulley 16, the axle body 28 only exerts a small guiding force on the flanks of the elongated hole 21.

FIG. 9 shows a securing element 26, which after arranging the belt pulley 16 concentrically to the tool axle 16 can be adjoin the inner plate of the belt pulley 16. An attachment 44 can be applied to a planar side of the disk-shaped securing element 26 which engages in the elongated hole 21 in the belt pulley 16. The securing element 26 also has an axial hole 45 so that the securing element 26 can be arranged on the axle body 28 or so that the central screw 31 can pass through the axial hole 45.

FIG. 10 shows a perspective view of the bearing arrangement 30 with which the axle body 28 can be borne in the tool axle 15 on the extension arm, 19. The axle body 28 has guide attachments 46 which guide the axle body 28 in the arc-shaped elongated hole 21 of the belt pulley 16 in accordance with the example of embodiment in FIG. 8. The guide attachments are also arc-shaped and correspond with the curvature of the elongate holes 21 designed as an arc-shaped groove. This makes for particularly good guidance of the axle body 28 in the elongated hole 21 in order to bring about the movement of the belt pulley 16 on the axle body 28 between the eccentric and the concentric position.

Figure 11:
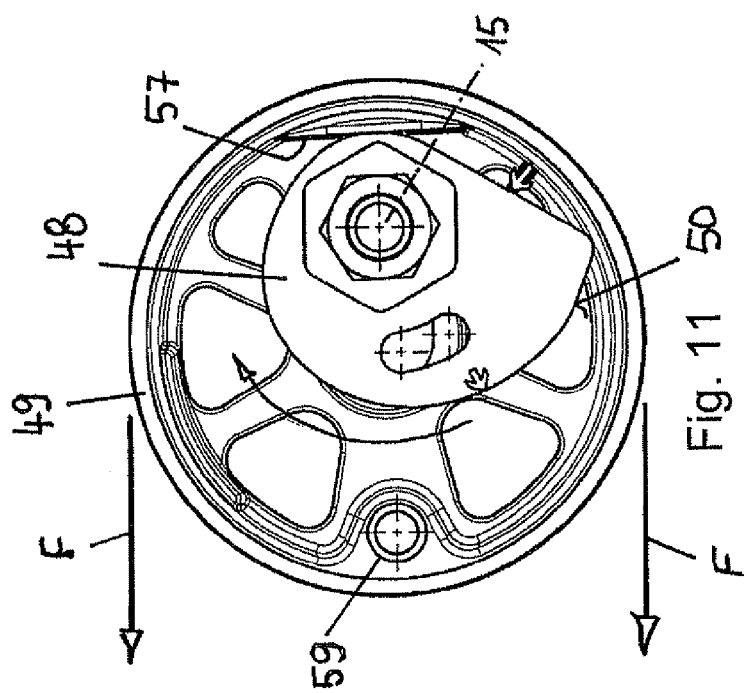
FIG. 11 shows a further example of embodiment of a tensioning wheel device with an assembly element contained in a belt pulley.

FIG. 11 shows a further example of embodiment of a tensioning device with a belt pulley 49 in which an assembly element 48 is arranged. The belt pulley 49 is axially offset with regard to the tool axle 15 and to tension the belt the axis of rotation of the belt pulley 49 must be brought into a concentric position with the tool axle 15. The assembly element 48 has an eccentric cam 50 which can press against a pressure surface 57 in the belt pulley 49 with the eccentric cam 59 and bring the belt pulley 49 into the tensioned position against the belt force F. The direction in which the assembly element 48 has to be turned about the tool axle 15 against the belt pulley 49 is indicated with an arrow.

So that the belt pulley 49 is not turned as a result of the friction between the eccentric cam 50 and the pressure surface 57, the bolt 25 can be inserted into the hole 59 in the belt pulley 49 as already shown in FIGS. 2a to 2c.

Figure 12:
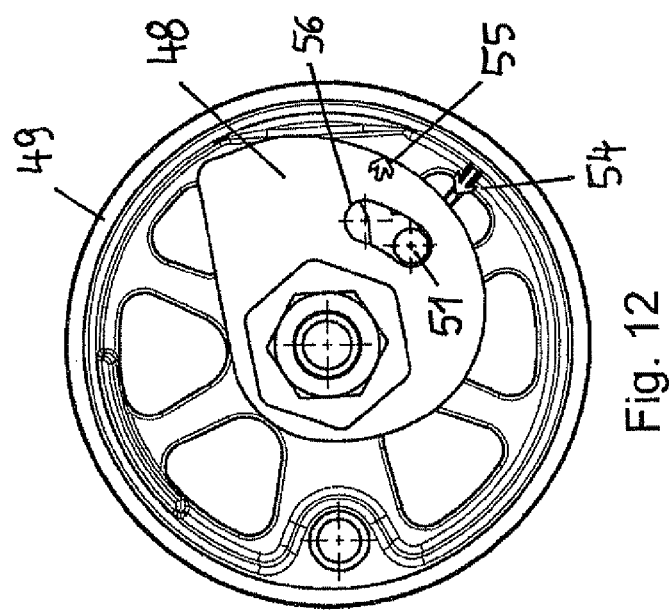
FIG. 12 shows the example of embodiment of the tensioning wheel device in accordance with FIG. 11 with an assembly element turned about the tool axle.

FIG. 12 shows the arrangement of the belt pulley 49 with the assembly element 48 in a further turning position of the assembly element 48 in the belt pulley 49. On the assembly element 48 a second marking arrow 55 is applied which is visible to a user and through turning of the assembly element 48 moves towards a first marking arrow 54 which is applied on the belt pulley 49. The assembly element 48 must be turned until the marking arrows 54 and 55 point to each other.

A threaded hole 51 is also present in the belt pulley 49 which in the shown turning position of the assembly element 48 already coincides with the elongated hole 56 in the assembly element 48. Even in this turning position of the assembly element 48 a securing screw 47 can be envisaged with which the assembly element 48 can be screwed to the belt pulley 49, and the securing screw 47 can be passed through the elongated hole 56 and screwed into the threaded hole 51. The position of the assembly element 48 is not yet shown in the nominal position and the assembly element 48 can be turned further until the two marking arrows 54 and 55 point to each other. However, for the required belt tension the turning position of the assembly element 48 may already be sufficient to operate the power tool 100.

FIG. 13 shows a further view of the belt pulley 49 with the assembly element 48 and the marking arrows 54 and 55 pointing to each other. In this definitive tensioning position of the assembly element 48 the threaded hole in the belt pulley 49 in the opposing end position of the elongated hole 56 so that the securing screw can still be inserted in this position.

FIG. 14 shows the arrangement of the securing screw 47 in the threaded hole 51 in the end position in the elongated hole 56. The securing screw 47 secures the assembly element 48 with the belt pulley 49. After tightening the securing screw 47 the assembly element 48 is already connected to the belt pulley 49 in a form-fitting manner, and the shown tensioning position, visible to the user through the marking arrows 54 and 55 pointing to each other, can be assured for operating the power tool 100.

The assembly element 48 has a hexagonal attachment 36 onto which a tool, for example a plug socket of the tool 100 can be mounted. However, the position of the securing screw 47 is such that the plug socket cannot be mounted on the hexagonal attachment 36 if the securing screw 47 is screwed into the threaded hole 51. This ensures that a user cannot turn the assembly element 48 in the belt pulley 49 if the assembly element 47 is still secured in the belt pulley 49 by the securing screw 47. Consequently the securing screw 47 must first be removed in order to turn the assembly element 48 via the hexagonal attachment 36.

FIG. 15 show a further perspective view of the belt pulley 49 from the rear so that the assembly element 48 is behind the belt pulley 49. This view shows that in the assembly element 48 on the planar side facing in the direction of the belt pulley 49, there are several grooves 53. On the belt pulley 49 there is a rib 52 which can engage in the grooves 53 on the assembly element 48.

This achieves, particularly when the securing screw 47 is screwed into the threaded hole 51, that the form-fit geometry 52, 53 formed by the ribs 52 and the grooves 53 between the assembly element 48 and the belt pulley 49 is secured. Consequently the securing screw 47 initially creates form fitting connection of the assembly element 48 in the belt pulley 49 in the direction of the tool axle 15 and the engagement of the rib 52 in one of the grooves forms a form-fit geometry which prevents turning of the assembly element 48 about the tool axle 15 relative to the belt pulley 49.

FIG. 16 shows a further perspective view of the belt pulley 49 in which the rib 52 is shown. This is flush with the marking arrow 54 and with the threaded hole 51, and if the user turns the assembly element 48 the threaded hole 51 can be covered over the turning angle by the assembly element 48 and the user only sees the elongated hole 56. However, through the flush arrangement of the marking arrow 54 on the belt pulley 49 with the rib 52 and the threaded hole 51 in the radial direction, the user is given information about the position of the rib 52 and the threaded hole 51. The belt pulley 49 can thus be brought into the concentric position with the tool axle 15 so that it at the end position within the elongated hole 58 in the belt pulley 49 in which the power tool can be operated.

FIG. 17 shows a single perspective view of the assembly element 48 from the side which is arranged facing the belt pulley 49. This view shows the grooves 53 into which the rib 52 of the belt pulley 49 can engage. The grooves 53 are arranged in the marginal area of the elongated hole 56 and the rib 52 can only engage in one of the grooves 53 if the threaded hole 51 coincides with the elongated hole 56. Also shown is the eccentric cam 50 on the assembly element 48, which in the end position, in which the belt pulley 49 is in the tensioned position, has an attachment 61 for enlarging the contact surface between the assembly element 48 and the pressure surface 57 in the belt pulley 49.

Figure 18:
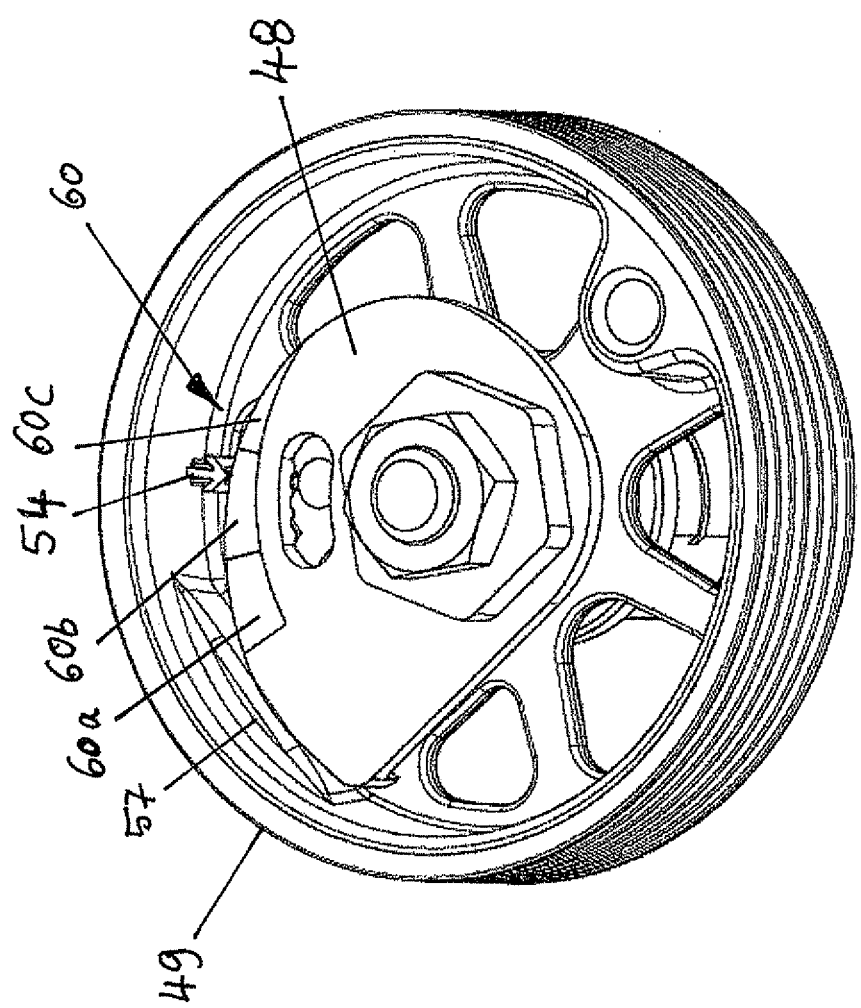

FIG. 18 finally shows a perspective view of the belt pulley 49 with an assembly element 48, whereby the marking arrow 55 applied on the assembly element 48 is replaced with a colour field 60 which can be brought into alignment with the marking arrow 54 on the belt pulley 49. The colour field has a first, for example red, field 60*a*, a second, for example, green field 60*b* and a third, for example also red field 60*c*. If the assembly element 48 is turned in the belt pulley 49 the marking arrow 54 on the belt pulley 49 can be brought into alignment with the colour field 60, whereby the alignment should take place the green field 60*b* in order to achieve a correct tension setting of the belt pulley 49. If the assembly element 48 is only turned as far as the first red field the belt tension is still insufficient. If, however, the assembly element 48 can be turned to align with the third red field 60*c*, inadmissible wear of the assembly element 48 or the pressure surface 57 in the belt pulley 49 can be assumed.

The invention is not restricted to the above preferred example of embodiment. Rather, a number of variants are conceivable which make use of the describe solution even in fundamentally different types of embodiment. All features and/or advantages, including design details or spatial arrangements set out in the claims, description or the drawings, can be essential to the invention by themselves and in the most varied of combinations. More particularly, the arrangement shown in FIGS. 8, 9 and 10 of the belt pulley 16 with the arc-shaped elongated hole 21, the securing element 26 with the adapted axle body 28 can be used in the examples of embodiment shown in FIGS. 1 to 7.

LIST OF REFERENCE SYMBOLS

100 Power tool
10 Motor
11 Belt drive
12 Tool
13 Drive axle
14 Drive-side belt pulley
15 Tool axle
16 Tool-side belt pulley
17 Belt
18 Assembly element
19 Extension arm
20 Eccentric cam
21 Elongated hole
22 Pressure surface
23 Hole
24 Elongated hole
25 Bolt
26 Securing element
27 Securing ring
28 Axle body
29 Recess
30 Bearing arrangement
31 Central screw
32 Hand tool (torx socket)
33 First marking arrow
34 Second marking arrow
35 Axial hole
36 Hexagonal attachment
37 Axial hole
38 Cover element
39 Rib
40 Space
41 Opening
42 Stop axle
43 Centring
44 Attachment
45 Attachment
46 Guide attachment
47 Securing screw
48 Assembly element
49 Belt pulley
50 Eccentric cam
51 Threaded hole
52 Form-fit geometry, rib
53 Form-fit geometry, groove
54 First marking arrow 55 Second marking arrow
56 Elongated hole
57 Turning surface
58 Elongated hole
59 Hole
60 Colour field
60a Red field
60b Green field
60c Red field
61 Attachment
F Belt force
I Concentric arrangement
II Eccentric arrangement

The invention claimed is:

1. A power tool with a motor and with a tool driven by the motor by way of a belt drive, the belt drive comprising:
a drive side belt pulley rotating in a drive axle;
a tool-side belt pulley rotating in a tool axle; and
a belt tensioned over the belt pulleys;
wherein:
at least one of the belt pulleys is movable into an eccentric position in relation to the axle on which the at least one of the belt pulleys is held; and
an assembly element is provided on the tool axle, the assembly element being pivotable around the tool axle and having an eccentric cam, the at least one of the belt pulleys being movable to a concentric position in relation to the tool axle by turning the assembly element about the tool axle and through pre-tensioning the belt.

2. The power tool in accordance with claim 1, wherein an extension arm is provided on which the tool is arranged in rotatable manner in the tool axle, whereby as a result of the extension arm there is a rigid distance between the drive axle and the tool axle, whereby in particular the belt pulley which is movable into an eccentric position in relation to its axle, is formed by the tool-side belt pulley.

3. The power tool in accordance with claim 1, wherein means are provided with which the belt pulley is rotationally blockable about the tool axle so that turning of the assembly element about the tool axle relative to the belt pulley is made possible, whereby the means are preferably formed by a hole in the belt pulley and an elongated hole in the extension arm, whereby a bolt is passable through the hole and through the elongated hole.

4. The power tool in accordance with claim 1, wherein a securing ring is provided, which in the concentric arrangement of the belt pulley in relation to the tool axle is mountable on an axle body of the tool axle and insertable into a recess in the belt pulley.

5. The power tool in accordance with claim 1, wherein a securing screw is provided with which the assembly element is attachable to the belt pulley.

6. The power tool in accordance with claim 5, wherein the assembly element has an elongated hole for passing the securing screw therethrough, which is dimensioned in such a way that the securing screw is passable through the elongated hole when the eccentric cam is unworn and/or when the assembly element sufficiently tensioned, whereby preferably there is a threaded hole in the belt pulley into which the securing screw is disposed.

7. The power tool in accordance with claim 5, wherein the assembly element and the belt pulley each have a form-fit geometry which is interlockable in a form-fitting manner and through which turning of the assembly element in the belt pulley is prevented, particularly if the assembly element is screwed to the belt pulley by way of the securing screw.

8. The power tool in accordance with claim 7, wherein the form-fit geometry has a rib provided on the belt pulley and grooves on the assembly element, whereby the rib engages in one of the grooves if the eccentric cam is unworn and/or if the assembly element is sufficiently tensioned.

9. The power tool in accordance with claim 5, wherein the assembly element is rotatable about the tool axle by means of a hexagonal attachment with a hand tool, whereby the securing screw is arranged relative to the hexagonal attachment such that the hand tool cannot be brought into effective contact with the hexagonal attachment when the securing screw is screwing the assembly element to the belt pulley.

10. The power tool in accordance with claim 5, wherein a first marking arrow is arranged on the belt pulley and a second marking arrow is arranged on the assembly element, whereby the marking arrows are movable towards each other by turning the assembly element about the tool axle, whereby an optimum tensioning of the assembly element in the belt pulley is achieved when the marking arrows point to each other.

11. A belt pulley of a belt drive for a power tool, whereby the belt drive has a drive side belt pulley rotating about a drive axle and a tool side belt pulley rotating about a tool axle, wherein at least one of the belt pulleys has an elongated hole through which the corresponding axle is passable, the at least one of the belt pulleys is mountable on the corresponding axle and movable along the elongated hole on the corresponding axle between an eccentric and a concentric position in relation to the corresponding axle wherein an assembly element is provided on the corresponding axle and which is pivotable around the corresponding axle wherein the assembly element has an eccentric cam, by means of which the at least one of the belt pulleys is movable between the eccentric and the concentric position in relation to the corresponding axle by turning the assembly element about the corresponding axle.

12. A method of fitting a belt of a belt drive between a motor and a tool of a power tool, the belt drive having a drive side belt pulley rotating about a drive axle and a tool side belt pulley rotating about a tool axle the method comprising:
moving at least one of the belt pulleys from a concentric position in relation to the axle on which the belt pulley is held in to an eccentric position,
fitting of a belt on the belt pulleys, and
returning the belt pulley into a concentric position in relation to the axle on which the belt pulley is held, whereby the belt is pre-tensioned, wherein an assembly element having an eccentric cam is provided on the corresponding axle, whereby the assembly element is pivotable about the corresponding axle so that by means of the eccentric cam the belt pulley is returned into the concentric position.

13. The method in accordance with claim 12, wherein a securing screw is provided with which the assembly element is screwed to the at least one of the belt pulleys, whereby the securing screw is screwed in when the assembly element is brought into an envisaged tensioning position and the at least one of the belt pulleys is brought into the concentric arrangement with the corresponding axle.

* * * * *